Nov. 16, 1954 D. A. HOWARD 2,694,431

TRACTION DEVICE FOR VEHICLES

Filed Sept. 10, 1951

INVENTOR.
DONALD A. HOWARD
BY
Charles R. Fay,
ATTORNEY

United States Patent Office 2,694,431
Patented Nov. 16, 1954

2,694,431

TRACTION DEVICE FOR VEHICLES

Donald A. Howard, Worcester, Mass.

Application September 10, 1951, Serial No. 245,785

1 Claim. (Cl. 152—225)

This invention relates to new and improved traction devices for vehicles, the main object of which is to render it possible to extract a vehicle from snow, mud, or the like, wherein said vehicle is mired, and another object of the invention resides in the provision of a simplified device of this nature which is extremely easy to apply and remove from the wheel or wheels which are desired to be so extracted.

A further object of the invention resides in the provision of two loops of elongated form which bear a certain relation to the circumference or tread of the tire or wheel to which it is to be applied, said loops being easily applied to the wheel in the nature of a chordal arrangement thereon and substantially parallel to each other at opposite sides of the axle and in a substantially spaced condition, each loop providing two tread portions transverse of the tire, which transverse portions act as the anti-skid means to extract the wheel from its bogged down condition.

A further object of the invention resides in the provision of the device above described wherein each loop is provided with a long side run which is bent out of the general plane of the loop and by which the loop is easily removed from the tire after the vehicle has been extracted from its mired position.

Other objects and advantages of the invention will appear hereinafter.

Reference is to be had to the accompanying drawings, in which

Many traction devices for the purpose stated have been suggested in the prior art but they are cumbersome, expensive, too complicated, difficult to apply, easily dislodged from the tire at relatively high speeds or they are impractical for many other reasons. The present device is extremely simple, easily applied, easily removed, effective in operation and incapable of flying off from the wheel when in use.

Figure 1:
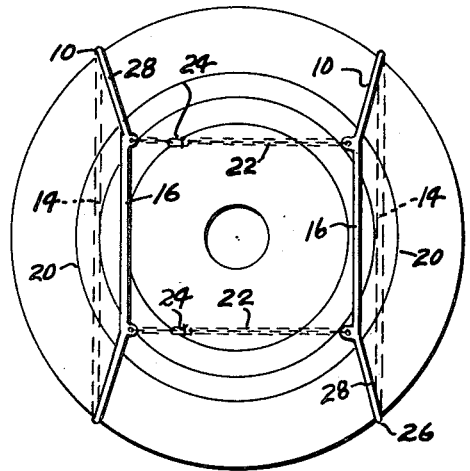
Fig. 1 is a view in elevation of a vehicle wheel showing the novel traction device applied thereto.
Figure 3:
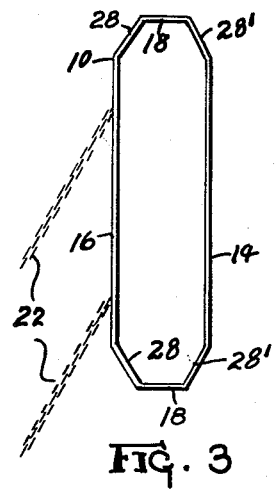
Fig. 3 is a plan view of one of the traction loops.

As shown in Fig. 1, the device comprises a pair of similar elongated loops generally indicated at 10. Each loop has a long straight run 14 and an opposite long run 16, the latter being bent down out of the plane of run 14 and short end pieces 18. The short end pieces 18 are adapted to lie transversely of the tread of the tire to which the device is applied and act to extract the vehicle from its mired position.

Figure 5:
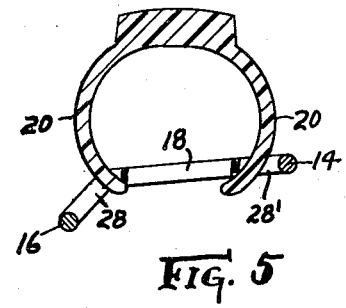
Fig. 5 is a section of a tire showing the relative location of a loop.
Figure 4:
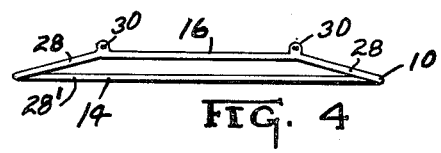
Fig. 4 is an edge view thereof.

Each loop is preferably made with dimensions such as to fit onto the tire casing substantially as shown in Fig. 1. One of the practical considerations of the invention resides in the fact that the runs 14 transect the tire below or inwardly of the major portion of its bulge at the side walls thereof, so that run 14 underlies the bulge. This bulge is represented by the reference numeral 20 and Figs. 1 and 5 clearly show that the side run 14, and naturally run 16, also lie below the widest part of the tire casing. This being so, the loops do not tend to drop off from the tire but tend to cling to it although they are easily applied as shown, since the distance between runs 14 and 16 is about the same as the width of the tire casing.

Each dropped or bent side run 16 is provided with two spaced short lengths of chain 22 connected by any type of chain tightener desired, so that when the two loops are applied to the tire, they are secured together but at one side only thereof, this side of course being that which faces the operator, i. e., the outside aspect of the tire as respects the vehicle.

In applying the device to the tire, one of the loops is held horizontally with the chains and dropped side run 16 facing the operator. The device is slid up under the fender, in the case of a passenger car, and deposited in a horizontal fashion at the top of the wheel, being then slide down along the tread in a clockwise direction until the lower end indicated at 26 rests on the ground or in the snow as the case may be or when any desired position is reached. The run 16 may then be brought inwardly by hand, and the loop tends to stick to the tire. The other loop is then applied in the same manner but is moved down counterclockwise at the opposite side of the tire, whereupon the operator then joins the chain parts 22 by the conventional tighteners 24 and the device is completely in position. The wheel may then be spun as fast as desired in order to extract the vehicle from its mired position.

Figure 2:
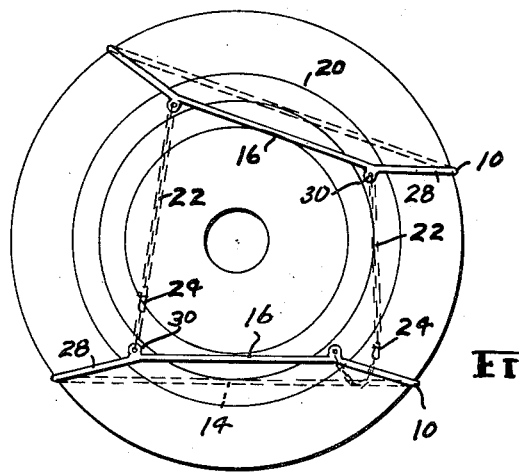
Fig. 2 is a view similar to Fig. 1 but showing the device as it ordinarily appears after use.

As is well known, a great deal of power is applied to a wheel that is being spun to extract it from a hole, and it has been found by actual experiment that the loops 10 tend to creep when the tire is wet so as to be wedged more tightly into the tire casing in the manner shown in Fig. 2. That is, corresponding ends 18 tend to approach each other and the opposite ends 18 tend to separate, while all of the end parts 18 dig into the rubber forming the tread of the tire casing. The loops become relatively deeply embedded although the chain to the left in Fig. 2 is of course not capable of stretching. Nevertheless, there is always some slack that is taken up as to this chain.

Under these circumstances, the device may be difficult to remove from the tire but it has been determined that by grasping the down-bent portion 16 and pulling upwardly thereon as to the uppermost loop 10 in Fig. 2 a fulcruming action is achieved which quickly and easily removes the device from the tire. Were the bent-down portion not present, this effect would not be achieved, as the fulcruming action would not be present.

The loops 10 are designed to closely engage the tire and are preferably made to the same outline. The length of the end pieces 18 substantially represent the width of the tread of the tire and the bent-out portions 28 provide for extending over the bulged out portions found in the usual tire side walls. The down-bent runs 16 and the chains provide that the loops tilt a little with the ends 18 at about a 6 degree or 7 degree angle to the horizontal when the loops are at the top of the tire, and this effect aids in providing the fulcruming action in the removal of the loops. The axis of pivot under these circumstances is approximately through and along run 14, see Fig. 5.

The run 16 has loops or fixtures 30 that may be used as hand-holds in attaching the devices, so that the loop will not slip or rotate in the hand.

It is to be noted that while the preferred embodiment of the invention has been illustrated, the loops may assume different forms, the main consideration being that the loops hug the tires and tend to stay fixed thereon under hand pressure. Thus the parts 14 and 28' must be rigid but parts 28, 16, and 18 could be light-weight, nonrigid rope, cable, chain or the like insofar as being wedged onto the tire and acting as traction devices is concerned. Tension is the major stress on parts 28 and 16.

Having thus described my invention and the advantages thereof, I do not wish to be limited to the details herein disclosed, otherwise than as set forth in the claim, but what I claim is:

Traction device for vehicle wheels comprising a plurality of elongated wire loops adapted to be arranged chordally on a wheel and tire thereon, said loops approximately conforming to the shape of the section of the wheel and tire thereon, said loops being of a size to fit the tires closely and being loosely secured to the tires by the resilience of the latter, detachable means securing the loops to each other, said means including non-stretchable flexible members at each side of the center of the wheel at one side only thereof, allowing convergence of the loops on the wheel at corresponding ends but preventing excess separation of the loops at the opposite ends during turning of the wheel in a mired condition, the flexible non-stretching means securing one side run of the loop to the corresponding side run of the other loop, said corresponding side runs being bent inwardly toward the wheel axle to more closely approach the same than the opposite, unsecured side runs at the other side of the wheel.

References Cited in the file of this patent

UNITED STATES PATENTS

| Number | Name | Date |
|---|---|---|
| 1,101,198 | Lashar | June 23, 1914 |
| 1,137,506 | Lyon | Apr. 27, 1915 |
| 1,249,969 | Kester | Dec. 11, 1917 |
| 2,507,037 | Miller | May 9, 1950 |

FOREIGN PATENTS

| Number | Country | Date |
|---|---|---|
| 830,563 | France | Aug. 3, 1938 |